W. P. WALKER.
VEHICLE ATTACHMENT.
APPLICATION FILED MAR. 13, 1916.
1,215,225.
Patented Feb. 6, 1917.
2 SHEETS—SHEET 1.
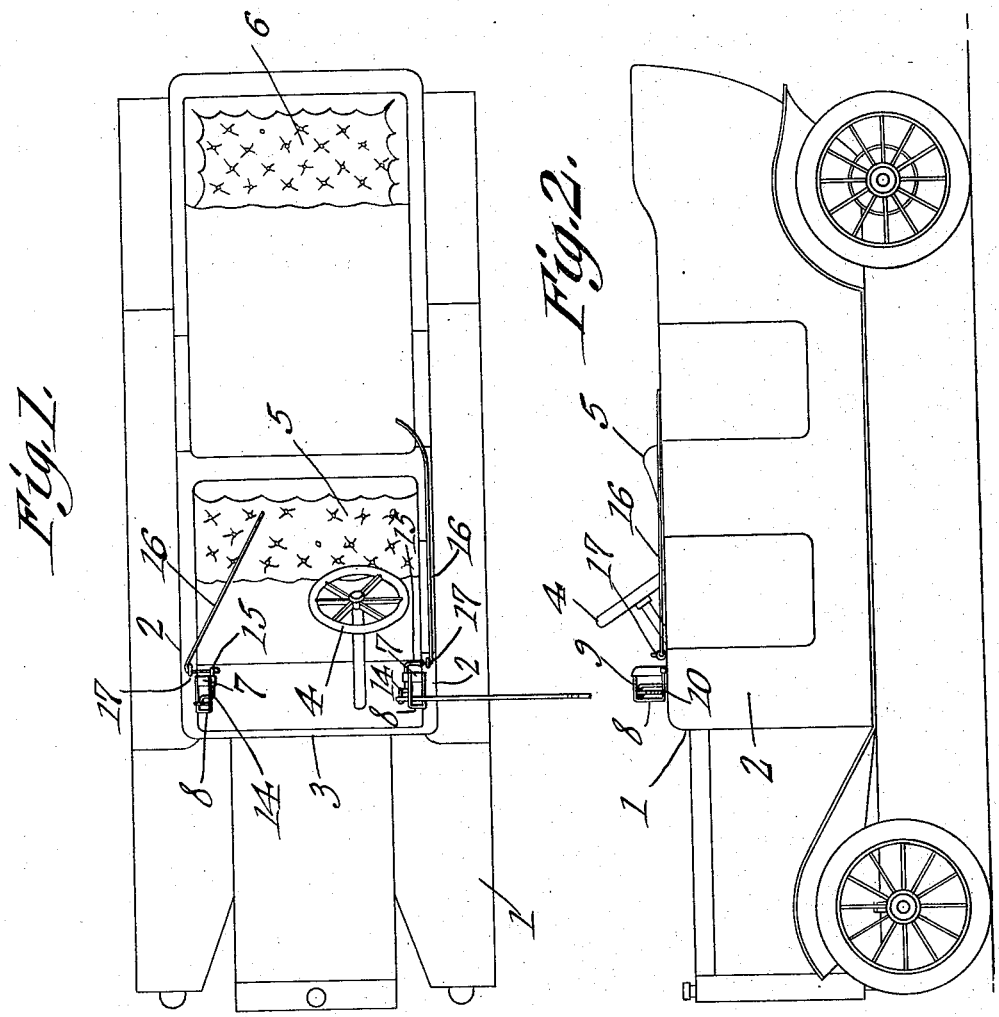

W. P. WALKER.
VEHICLE ATTACHMENT.
APPLICATION FILED MAR. 13, 1916.
1,215,225.
Patented Feb. 6, 1917.
2 SHEETS—SHEET 2.
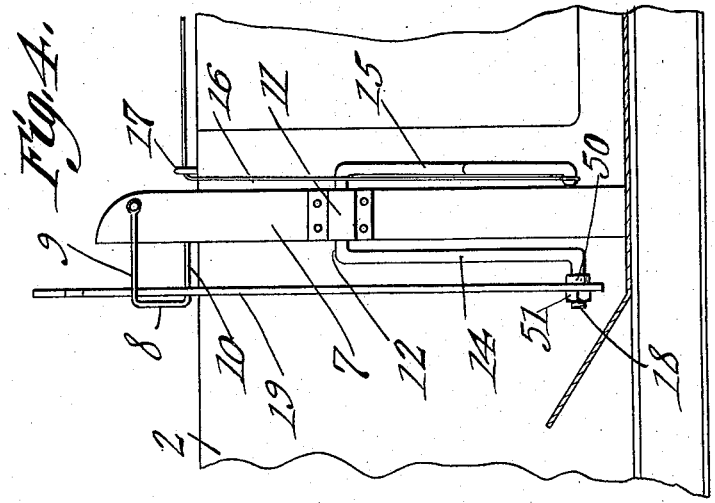
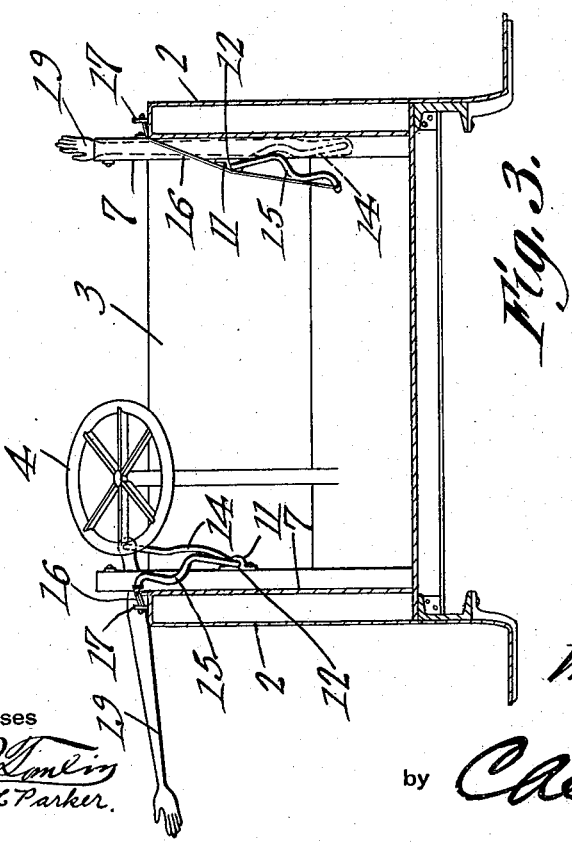
Witnesses
W. P. Walker
Inventor
by
Attorneys

UNITED STATES PATENT OFFICE.

WILEY P. WALKER, OF SAN ANTONIO, TEXAS.

VEHICLE ATTACHMENT.

1,215,225.   Specification of Letters Patent.   Patented Feb. 6, 1917.

Application filed March 13, 1916. Serial No. 83,946.

*To all whom it may concern:*

Be it known that I, WILEY P. WALKER, a citizen of the United States, residing at San Antonio, in the county of Bexar and State of Texas, have invented a new and useful Vehicle Attachment, of which the following is a specification.

The device forming the subject matter of this application is an attachment for a vehicle, the attachment being adapted to be manipulated so that the drivers of approaching vehicles may be advised as to the direction in which the vehicle carrying the attachment is about to turn.

The invention aims, specifically, to provide indicators of novel form, to provide novel means whereby the indicators are housed within the contour of the vehicle body, and to provide novel means for raising and moving outwardly, the aforesaid indicators.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in top plan, a motor propelled vehicle equipped with the device forming the subject matter of this application;

Fig. 2 is a side elevation of the structure shown in Fig. 1;

Fig. 3 is a transverse section of a vehicle equipped with the device herein disclosed;

Fig. 4 is a fragmental section of a vehicle carrying the mechanism forming the subject matter of this application.

In the accompanying drawings, the numeral 1 indicates a motor propelled vehicle of usual construction, including side walls 2, a dash board 3, a steering wheel 4, a front seat 5 and a rear seat 6. Secured to the inner faces of the side walls 2 of the vehicle and located between the front seat 5 and the dash board 3 are upright standards 7, constituting, to all intents and purposes, a part of the vehicle body, the upper ends of the standards 7 being equipped with loop-shaped guides 8, each guide 8 including an upper arm 9 and a lower arm 10, the upper arm 9 being secured to the inner face of the standard 7 and the lower arm 10 being secured to the outer face of the standard 7 as will be clearly understood from Fig. 4 of the drawing. Mounted on each standard 5 intermediate its upper and lower ends is a bearing 11 in which is mounted to rock a shaft 12 provided at one end with a crank arm 14 and equipped at its other end with an offset crank arm 15. The invention comprises an actuating member 16, preferably in the form of a cord, rove through an eye 17 placed on the upper edge of the side wall 2, the lower end of the flexible actuating member 16 being attached to the lower end of the crank arm 15, the offsetting of the arm permitting the shaft 12 to be rotated when the actuating member or cord 16 is drawn upon. The free ends of the cords 16 may be disposed as desired. Preferably, the cords 16 lead to the front seat 5, one cord being so arranged in Fig. 1 of the drawings, the figure showing also that, if desired, one or both of the cords may lead rearwardly, so as to be accessible from the rear seat 6, the other of the said cords being so positioned in Fig. 1. The lower end of the crank arm 14 carries a wrist pin 18 on which is journaled the lower end of an indicator 19 passing upwardly through the guide 8. The arm 14 carries a shoulder 50 and a nut 51 coacting to retain the lower end of the indicator 19 on the arm. The indicator 19 preferably is in the form of a rigid bar which, when not in use, is housed within the contour of the vehicle body, as clearly shown in Fig. 3 of the drawing, the indicator 19 being supported on the wrist pin 18, preferably, so as not to mar the bottom of the vehicle.

It will be understood that by pulling upon either of the cords 16, the shaft 12 will be rotated through the instrumentality of the arm 15, whereupon the arm 14 and the wrist pin will elevate and move outwardly, the inner end of the corresponding indicator 19, the said indicator moving outwardly through the guide 8 in contact with the lower arm 10, any marring of the upper edge of the side wall 2 of the vehicle body thus being avoided. The indicator 19, when manipulated as above described, assumes the outstanding position shown at the left hand side of Fig. 3. When the occasion for the use of the indicator 19 has passed, the indicator assumes the vertical, upright position shown at the right hand side of Fig. 3, and lies within the vehicle body.

From the foregoing it will be obvious that, by pulling upon either of the cords 16, the operator of an approaching vehicle will be advised as to the direction in which the vehicle carrying the device forming the subject matter of this application is about to turn. The construction is such that the operator may draw upon either of the cords 16, with one hand, without removing the other hand from the steering wheel 4. Further, as hereinbefore intimated, the cords 16 may be extended, so that they may be manipulated from the rear seat 6.

The standards 7 may be placed on any part of the vehicle body.

Having thus described the invention, what is claimed is:—

1. In a device of the class described, a vehicle body comprising a side wall; a standard located adjacent the inner face of the side wall; a loop-shaped guide disposed above the upper edge of the side wall and including horizontally disposed inner and outer arms attached respectively to the opposite sides of the standard, the inner arm being located at a greater height than the outer arm; an upright indicator disposed within the guide and mounted therein to move upwardly between the arms, and to move outwardly in slidable contact with the outer arm, the inner arm coacting with the upper edge of the indicator to hold the same in a substantially horizontal position when the indicator is moved outwardly; a shaft journaled on the standard and comprising arms, one of which is offset, the other of which is pivotally assembled with the lower end of the indicator; a direction-changing element and means for supporting the same; and a flexible member passed through the direction-changing element, one end of the flexible member being connected with the offset arm.

2. A vehicle body comprising a side wall; a standard adjacent the inner face of the side wall; a loop-shaped guide disposed above the upper edge of the side wall and including horizontally disposed inner and outer arms assembled with the standard, the inner arm being located at a greater height than the outer arm; an upright indicator disposed within the guide and mounted therein to move upwardly between the arms and to move outwardly in slidable contact with the outer arm, the inner arm coacting with the upper edge of the indicator to hold the same in a substantially horizontal position when the indicator is moved outwardly; and means for raising the indicator and moving the same outwardly.

In testimony that I claim the foregoing as my own, I have hereto affixed my signature in the presence of two witnesses.

WILEY P. WALKER.

Witnesses:
G. GRAHAM WATTS,
WILLIAM C. ZIZELMANN.

Copies of this patent may be obtained for five cents each, by addressing the "Commissioner of Patents, Washington, D. C."